(12) United States Patent
Kameyama et al.

(10) Patent No.: US 11,739,837 B2
(45) Date of Patent: Aug. 29, 2023

(54) SHIFT DEVICE

(71) Applicant: KABUSHIKI KAISHA TOKAI-RIKA-DENKI-SEISAKUSHO, Aichi-ken (JP)

(72) Inventors: Keisuke Kameyama, Aichi-ken (JP); Kenji Nakanishi, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 64 days.

(21) Appl. No.: 16/670,102

(22) Filed: Oct. 31, 2019

(65) Prior Publication Data

US 2020/0149634 A1 May 14, 2020

(30) Foreign Application Priority Data

Nov. 9, 2018 (JP) .................................. 2018-211567

(51) Int. Cl.
| | | |
|---|---|---|
| *F16H 59/02* | (2006.01) | |
| *F16H 61/24* | (2006.01) | |
| *F16H 63/30* | (2006.01) | |
| *F16H 59/10* | (2006.01) | |
| *F16H 59/08* | (2006.01) | |

(52) U.S. Cl.
CPC ..... *F16H 63/3013* (2013.01); *F16H 59/0204* (2013.01); *F16H 59/08* (2013.01); *F16H 59/10* (2013.01); *F16H 2061/243* (2013.01)

(58) Field of Classification Search
CPC .. F16H 63/3013; F16H 59/0204; F16H 59/10; F16H 59/0278; F16H 2059/047; F16H 2059/0295; F16H 2061/243; B60K 20/02
USPC ........ 74/473.3, 473.21, 473.25, 473.26, 502, 74/103, 104
See application file for complete search history.

(56) References Cited

U.S. PATENT DOCUMENTS

| | | | | |
|---|---|---|---|---|
| 4,756,205 A | * | 7/1988 | Dickinson | ............... F16H 59/04 74/471 XY |
| 4,788,099 A | * | 11/1988 | Fukushima | ............. B32B 15/08 428/215 |
| 6,382,045 B1 | * | 5/2002 | Wheeler | ................. F16H 61/24 74/473.12 |
| 9,494,228 B2 | * | 11/2016 | Hermansson | ........... F16H 61/24 |
| 2009/0277716 A1 | * | 11/2009 | Eadara | .................... B32B 25/08 181/290 |

(Continued)

FOREIGN PATENT DOCUMENTS

| | | |
|---|---|---|
| DE | 19649745 A1 | 6/1997 |
| DE | 10003140 C1 * | 8/2001 ............. F16H 59/08 |

(Continued)

*Primary Examiner* — T. Scott Fix
(74) *Attorney, Agent, or Firm* — Thomas W. Cole; Calderon Safran & Cole P.C.

(57) ABSTRACT

In a shift device, as a result of lower sliding projections of a lever moving slidingly against lower sliding plates of soft materials, the slidability of the lever is improved. Moreover, as a result of restricting projections of the lever being abutted against stoppers of the soft materials, noise generated when a sliding motion of the lever is restricted is reduced. Additionally, because the lower sliding plates and the stoppers are formed integrally with each other, the structure can be simplified.

9 Claims, 5 Drawing Sheets

(56) References Cited

U.S. PATENT DOCUMENTS

| | | | | |
|---|---|---|---|---|
| 2011/0290058 A1* | 12/2011 | Hahn | .................. | F16H 59/0208 |
| | | | | 74/473.22 |
| 2013/0139632 A1* | 6/2013 | Rake | ...................... | F16H 61/24 |
| | | | | 74/473.3 |
| 2014/0326096 A1* | 11/2014 | Kim | ........................ | F16H 59/08 |
| | | | | 74/473.3 |
| 2016/0131247 A1* | 5/2016 | Kim | ........................ | B60K 35/00 |
| | | | | 74/473.3 |
| 2017/0159808 A1* | 6/2017 | Kuhne | ................. | F16H 59/0208 |
| 2019/0128404 A1* | 5/2019 | Morales | ................ | F16H 59/105 |

FOREIGN PATENT DOCUMENTS

| | | | | | |
|---|---|---|---|---|---|
| DE | 102014016325 | A1 * | 5/2016 | ............. | B60K 20/08 |
| JP | 2002-029277 | A | 1/2002 | | |
| JP | 2007-290602 | A | 11/2007 | | |
| JP | 2007290602 | A * | 11/2007 | ......... | F16H 59/0204 |
| KR | 1020040028193 | A | 4/2004 | | |

\* cited by examiner

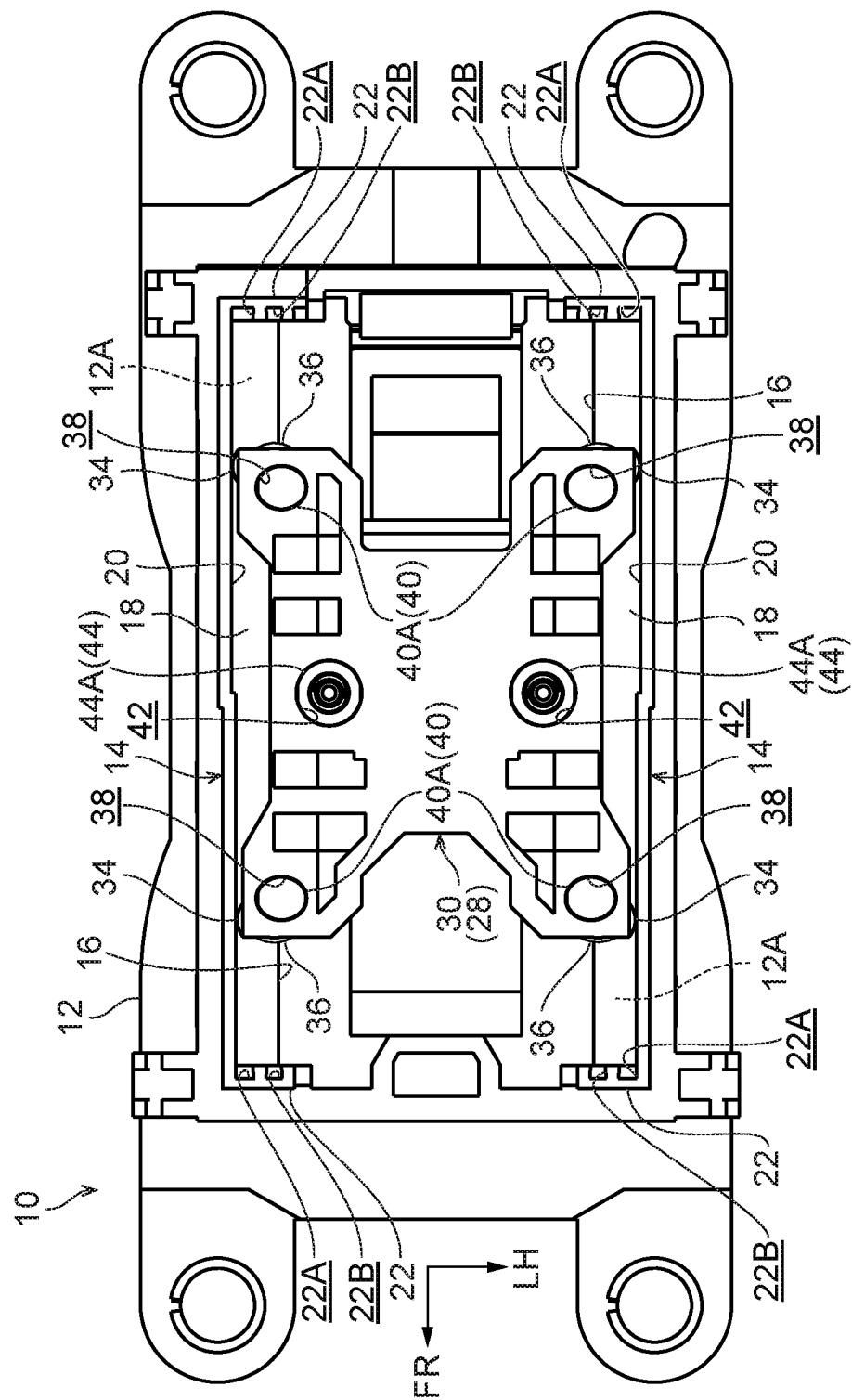

SHIFT DEVICE

CROSS-REFERENCE TO RELATED APPLICATION

This application is based on and claims priority under 35 USC 119 from Japanese Patent Application No. 2018-211567 filed on Nov. 9, 2018, the disclosure of which is incorporated by reference herein.

BACKGROUND

Technical Field

The present invention relates to a shift device in which a shift position is altered as a result of a shift body being slidingly moved.

Related Art

In shift lever device described in Japanese Unexamined Patent Application (JP-A) No. 2007-290602, a shift lever is able to perform a sliding motion relative to a housing.

Here, in this type of shift lever device, it is preferable that, by means of a simple structure, it be possible to improve the slidability of the shift lever, and to reduce the noise generated when the sliding motion of the shift lever is restricted.

SUMMARY

The present invention was conceived in view of the above-described circumstances, and it is an object thereof to provide a shift device that, by means of a simple structure, enables the slidability of a shift body to be improved, and also enables the noise generated when the sliding motion of the shift body is restricted to be reduced.

A shift device according to a first aspect of the present invention comprises a shift body that is provided with a sliding portion and a restricted portion, and that, as a result of being moved slidingly, causes a shift position to be altered; a slid-against portion that is formed from a softer material than the sliding portion, and along which the sliding portion is moved slidingly as a result of the shift body being moved slidingly; and a restricting portion that is formed from a softer material than the restricted portion, that is provided integrally with the slid-against portion, and that restricts a sliding motion of the restricted portion so that a sliding motion of the shift body is restricted.

In the shift device of the first aspect of the present invention, the shift position is altered as the result of the shift body being moved slidingly. In addition, as the result of the shift body being moved slidingly, the sliding portion of the shift body is moved slidingly relative to the slid-against portion. Furthermore, the restricting portion restricts the sliding motion of the restricted portion of the shift body, so that the sliding motion of the shift body is restricted.

Here, the slid-against portion is formed from a softer material than the sliding portion of the shift body. Because of this, the slidability of the shift body can be improved. Furthermore, the restricting portion is also formed from the softer material than the restricted portion of the shift body. Because of this, noise that is generated when the sliding motion of the shift body is restricted can be reduced. Moreover, the slid-against portion and the restricting portion are formed as a single integrated body. Because of this, the structure thereof can be simplified.

A shift device of a second aspect of the present invention is characterized in that, in the shift device of the first aspect of the present invention, there is provided a supporting body that supports the shift body, and with which the slid-against portion and the restricting portion are integrally molded.

In the shift device of the second aspect of the present invention, the supporting body supports the shift body, and the slid-against portion and the restricting portion are integrally molded with the supporting body. Because of this, the number of assembly steps can be reduced.

A shift device of a third aspect of the present invention is characterized in that, in the shift device of the first aspect or second aspect of the present invention, there is provided a sliding motion urging mechanism that urges the shift body towards the slid-against portion side.

In the shift device of the third aspect of the present invention, the sliding motion urging mechanism urges the shift body towards the slid-against portion side. Because of this, a tilting motion of the shift body can be inhibited, and the slidability of the shift body can be improved.

A shift device of a fourth aspect of the present invention is characterized in that, in the shift device of the third aspect of the present invention, the sliding motion urging mechanism urges the shift body towards a sliding width direction side of the shift body.

In the shift device of the fourth aspect of the present invention, the sliding motion urging mechanism urges the shift body towards the sliding width direction side of the shift body. Because of this, any play in the shift body in the sliding width direction can be inhibited, and the slidability of the shift body can be improved.

The shift device of the fifth aspect of the present invention is characterized in that, in the shift device of any one of the first through fourth aspects of the present invention, there is provided a shift urging mechanism that urges the shift body towards a slid-against portion side and a shift position side.

In the shift device of the fifth aspect of the present invention, the shift urging mechanism urges the shift body towards the shift position side.

Here, the shift urging mechanism urges the shift body towards the slid-against portion side. Because of this, a tilting motion of the shift body can be inhibited, and the slidability of the shift body can be improved.

A shift device of a sixth aspect of the present invention is characterized in that, in the shift device of any one of the first through fifth aspects of the present invention, a detecting portion is provided at a slid-against portion side of the shift body, and, as a result of a slide position thereof being detected, the shift position of the shift body is detected.

In the shift device of the sixth aspect of the present invention, the shift position of the shift body is detected as the result of the slide position of the detecting portion of the shift body being detected.

Here, the detecting portion is provided at the slid-against portion side of the shift body. Because of this, the accuracy of the slide position of the detecting portion resulting from a sliding motion of the shift body can be increased, and the accuracy of the detection of the shift position of the shift body can also be increased.

A shift device of a seventh aspect of the present invention is characterized in that, in the shift device of any one of the first through sixth aspects of the present invention, a reduced-rigidity portion at which a rigidity of the restricting portion is reduced is provided at the restricting portion.

In the shift device of the seventh aspect of the present invention, the reduced-rigidity portion of the restricting portion reduces the rigidity of the restricting portion.

Because of this, noise that is generated when the sliding motion of the shift body is restricted can be effectively reduced.

BRIEF DESCRIPTION OF THE DRAWINGS

Exemplary embodiments of the present invention will be described in detail based on the following figures, wherein:

FIG. 5 is cross-sectional view (taken across a line 5-5 in FIG. 3) looking from an upper side showing the shift device according to the exemplary embodiment of the present invention.

DETAILED DESCRIPTION

Figure 1:
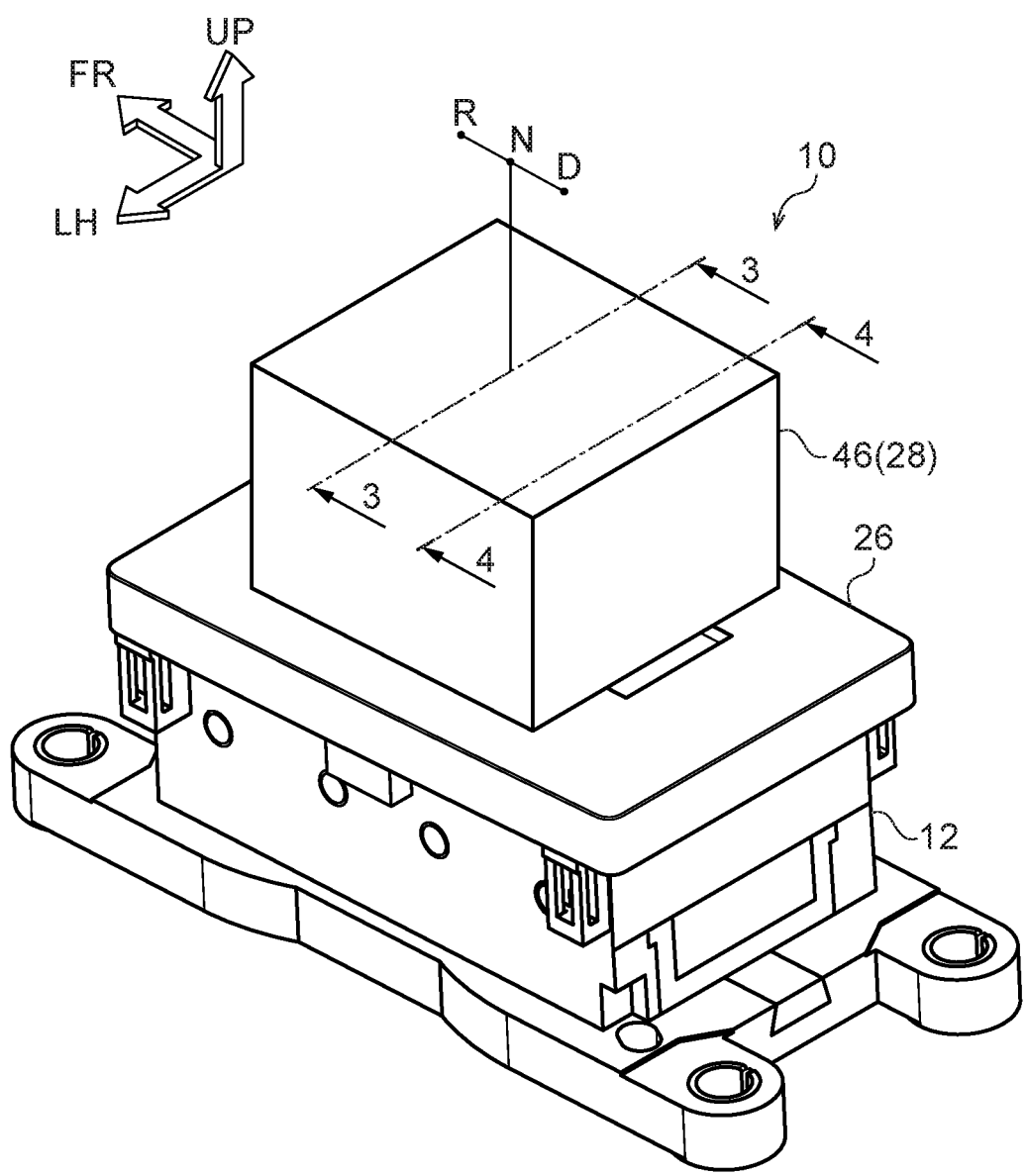
FIG. 1 is a perspective view looking from a diagonally rear-left direction showing a shift device according to an exemplary embodiment of the present invention.

A shift device 10 according to an exemplary embodiment of the present invention is shown in FIG. 1 in a perspective view looking from a diagonally rear-left direction. Furthermore, the shift device 10 is shown in an exploded perspective view looking from the diagonally rear-left direction in FIG. 2, and the shift device 10 is shown in a cross-sectional view (taken across a line 3-3 in FIG. 1) looking from the rear side in FIG. 3. Note that an arrow FR, an arrow LH, and an arrow UP that are shown in the appropriate drawings respectively indicate a shift device 10 forward direction, a shift device 10 left-side direction, and a shift device 10 upward direction.

The shift device 10 according to the present exemplary embodiment is a floor-mounted shift device, and is disposed in a central portion in a vehicle width direction of a floor portion of a vehicle cabin of a vehicle (i.e., an automobile), and the front side, left side, and upper side of the shift device 10 respectively face towards the front side, left side, and upper side of the vehicle.

Figure 2:
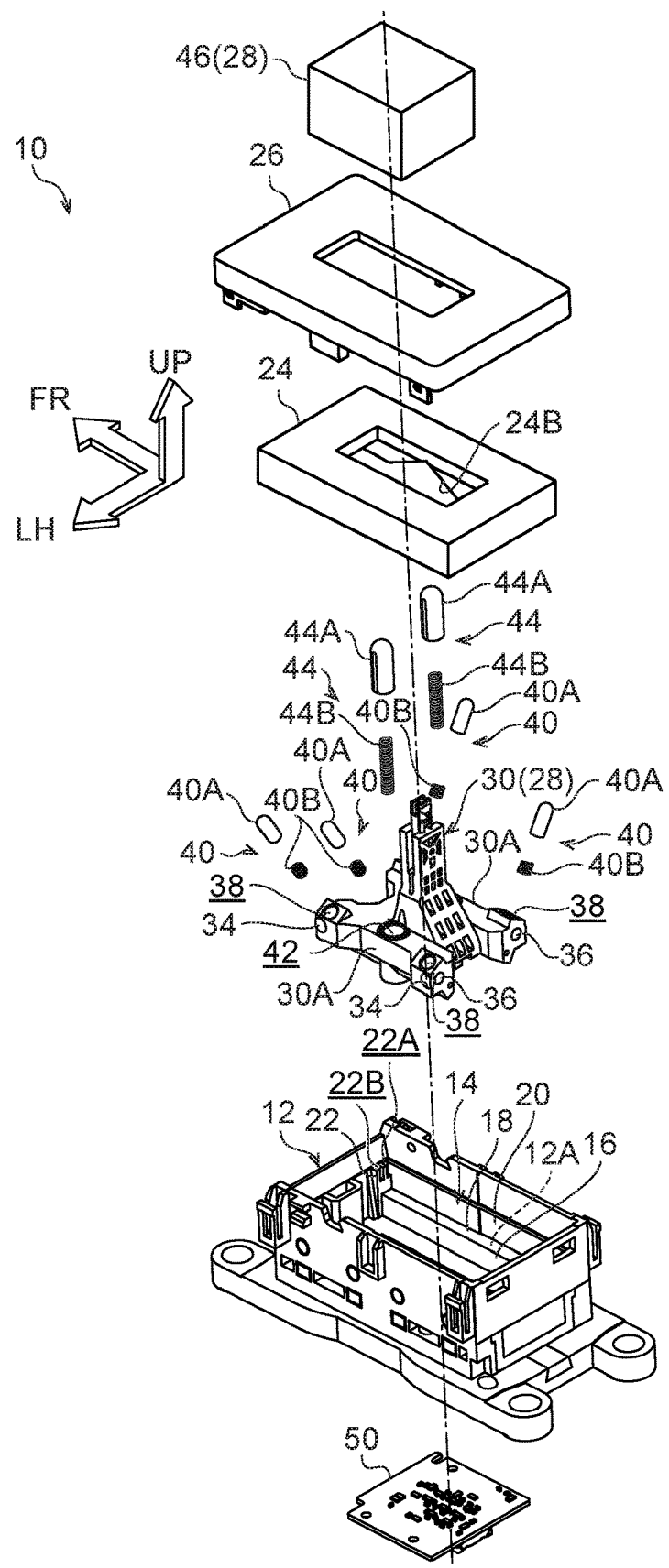
FIG. 2 is an exploded perspective view looking from a diagonally rear-left direction showing the shift device according to the exemplary embodiment of the present invention.
Figure 3:
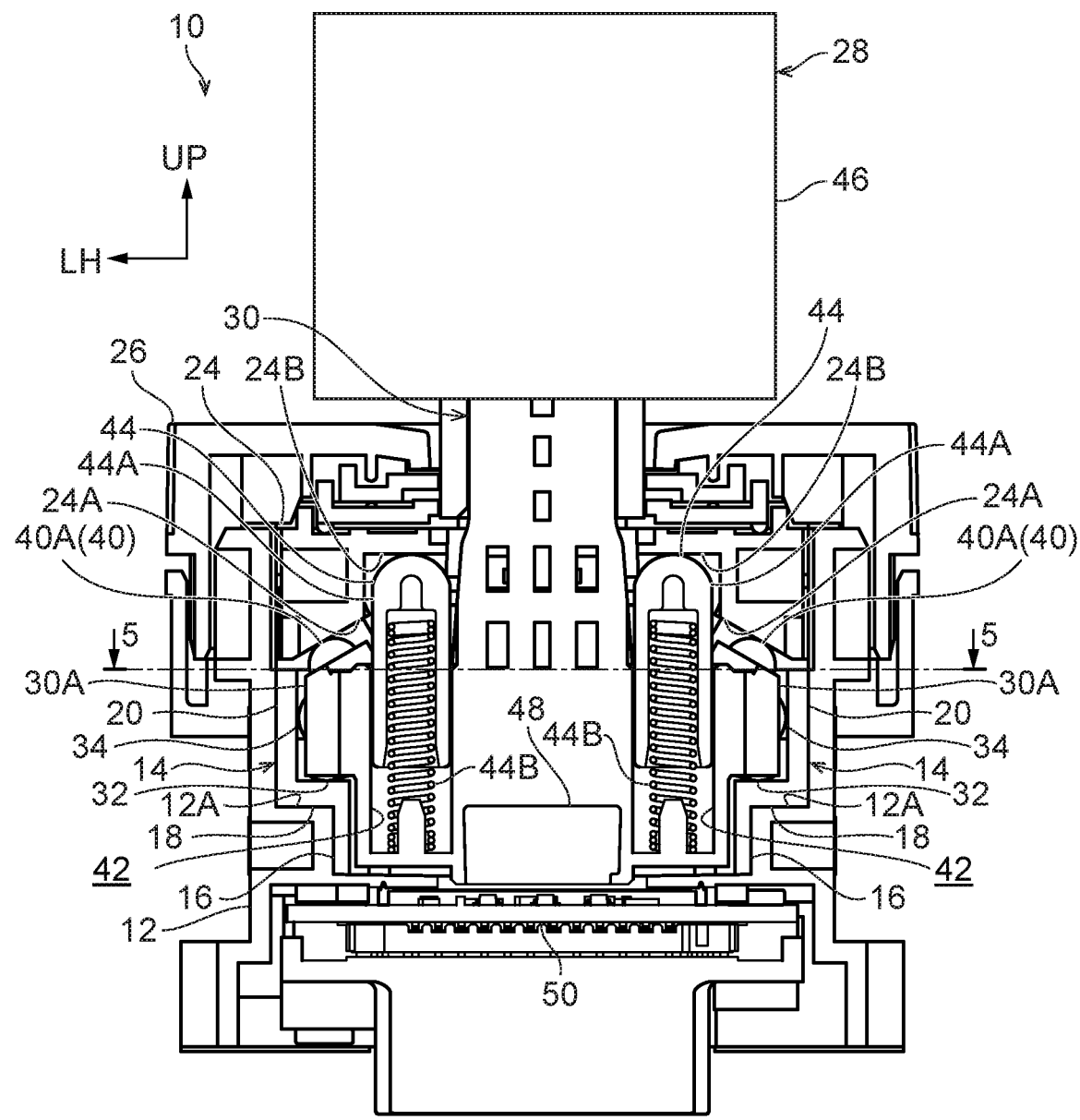
FIG. 3 is a cross-sectional view (taken across a line 3-3 in FIG. 1) looking from the rear side showing the shift device according to the exemplary embodiment of the present invention.

As is shown in FIG. 1 through FIG. 3, a substantially rectangular parallelepiped-box shaped base plate 12 which is made from a hard resin (for example, a glass fiber reinforced nylon resin) and serves as a supporting body (on the vehicle-body side) is provided in the shift device 10. The base plate 12 is installed on (i.e., fixed to) the floor portion of the vehicle cabin, and an interior portion of the base plate 12 is open on both an upper side and a lower side thereof. Substantially rectangular-column shaped protruding portions 12A are formed in lower portions of a left wall and a right wall of the base plate 12. These protruding portions 12A protrude towards an inner side in both the left and right directions of the base plate 12, and are disposed over the entire interior of the base plate 12 in the front-rear direction thereof.

Soft materials 14 that are formed from a soft resin (for example, Hytrel (Registered Trademark)) are integrally formed via insert molding with a lower-side portion of both a left portion and a right portion of the base plate 12 interior. The soft materials 14 extend over the entire front-rear direction of the interior of the base plate 12. Elongated rectangular-plate shaped covering plates 16 are provided in a lower portion of the soft materials 14, and these covering plates 16 cover protruding end surfaces (i.e., surfaces on the inner side in the left and right directions of the base plate 12) of the protruding portions 12A of the base plate 12.

Elongated rectangular-plate shaped lower sliding plates 18 which serve as slid-against portions are provided in an intermediate portion in the up-down direction of the soft materials 14, and these lower sliding plates 18 cover an upper surface of the protruding portions 12A. Elongated rectangular-plate shaped horizontal sliding plates 20 which serve as slid-against portions are provided in an upper portion of the soft materials 14, and these horizontal sliding plates 20 cover a left wall and a right wall of the base plate 12 on the upper side of the protruding portions 12A.

Rectangular-pate shaped stoppers 22 (see FIG. 5) which serve as restricting portions are provided in an upper portion of a front end and a rear end of the soft materials 14. The stoppers 22 cover the front wall and the rear wall of the base plate 12 on the upper side of the protruding portions 12A. Outer recessed portions 22A and intermediate recessed portions 22B that each have a rectangular cross-section and serve as reduced-rigidity portions are formed in upper side portions of the stoppers 22. The outer recessed portions 22A and the intermediate recessed portions 22B are disposed respectively in the horizontal sliding plate 20-side end portions and the intermediate portions in the left-right direction of the stoppers 22. The outer recessed portions 22A and the intermediate recessed portions 22B extend in the up-down direction, and are open on the upper side and inner side in the front-rear direction of the soft materials 14. The outer recessed portions 22A and the intermediate recessed portions 22B cause the rigidity of the upper-side portion of the stoppers 22 to be reduced. In addition, surfaces on the inner side in the left-right direction of the base plate 12 of portions of the stoppers 22 that are located further to the inner side in the left-right direction of the base plate 12 than the intermediate recessed portions 22B are exposed to the inner side in the left-right direction of the base plate 12.

A substantially rectangular-plate shaped holder 24 that is made from a hard resin (for example, a glass fiber reinforced nylon resin) is fixed to an upper portion of the interior of the base plate 12. Urging surfaces 24A are provided at left end-portion and a right end-portion of a lower surface of the holder 24. The urging surfaces 24A extend in the front-rear direction, and are inclined so as to slope downwards as they approach the outer sides in the left-right directions of the holder 24. Moderating surfaces 24B are provided on inner sides in the left-right direction of the holder 24 of the urging surfaces 24A on a left portion and a right portion of the lower surface of the holder 24. The moderating surfaces 24B are inclined so as to slope downwards as they approach the front side and the rear side from a central portion in the front-rear direction, and are disposed so as to be parallel to the left-right direction.

A substantially rectangular parallelepiped-box shaped housing gate 26 (i.e., a cover) that is made from a hard resin (for example, ABS resin) and serves as a covering body is fixed to an upper side of the base plate 12. An interior of the housing gate 12 is open on the lower side thereof, and covers the interior of the base plate 12 from the upper side thereof.

A substantially column-shaped lever 28 which serves as a shift body is supported within the base plate 12 interior, and this lever 28 extends in the up-down direction.

A lever main body 30 that is made from a hard resin (for example, a glass fiber reinforced nylon resin) and serves as a main body portion is provided in a lower-side portion of the lever 28. The lever main body 30 is formed from a harder material than the soft materials 14 of the base plate 12 interior. Substantially rectangular-column shaped slides 30A are formed integrally with both a left side and a right side of a lower end portion of the lever main body 30. The slides 30A protrude towards the outer sides in the left and right directions of the lever main body 30, and also extend in the front-rear direction.

Lower sliding projections 32 which serve as sliding portions are formed integrally with lower surfaces of a front end portion and a rear end portion of the slides 30A. In addition, horizontal siding projections 34 which serve as sliding portions are formed integrally with surfaces on the outer sides in the left and right directions of the lever main body 30 of the front end portion and the rear end portion of the slides 30A. The lower sliding projections 32 and the horizontal sliding projections 34 protrude in a spherical shape. The lower sliding projections 32 and the horizontal sliding projections 34 abut respectively against the lower sliding plates 18 and the horizontal sliding plates 20 of the soft materials 14, and at the same time as the lower sliding projections 32 and horizontal sliding projections 34 are moved slidingly in the front-rear direction relatively to the lower sliding plates 18 and the horizontal sliding plates 20 respectively, the slides 30A are also moved slidingly in the front-rear direction so that the lever 28 is moved slidingly in the front-rear direction.

Restricting projections 36 (see FIG. 5) which serve as restricted portions are formed integrally with a front surface and a rear surface of the slides 30A, and these restricting projections 36 protrude in a spherical shape. The front-side restricting projections 36 face towards the upper-side portion of the stoppers 22 in the front-rear direction on the front side of the soft materials 14. As a result of the front-side restricting portions 36 abutting against the upper-side portions (i.e., those portions around the intermediate recessed portions 22B) of the front-side stoppers 22, a sliding motion of the slides 30A towards the front side is restricted, so that a sliding motion of the lever 28 towards the front side is restricted. The rear-side restricting projections 36 face towards the upper-side portion of the stoppers 22 in the front-rear direction on the rear side of the soft materials 14. As a result of the rear-side restricting portions 36 abutting against the upper-side portions (i.e., those portions around the intermediate recessed portions 22B) of the rear-side stoppers 22, a sliding motion of the slides 30A towards the rear side is restricted, so that a sliding motion of the lever 28 towards the rear side is restricted.

Figure 4:
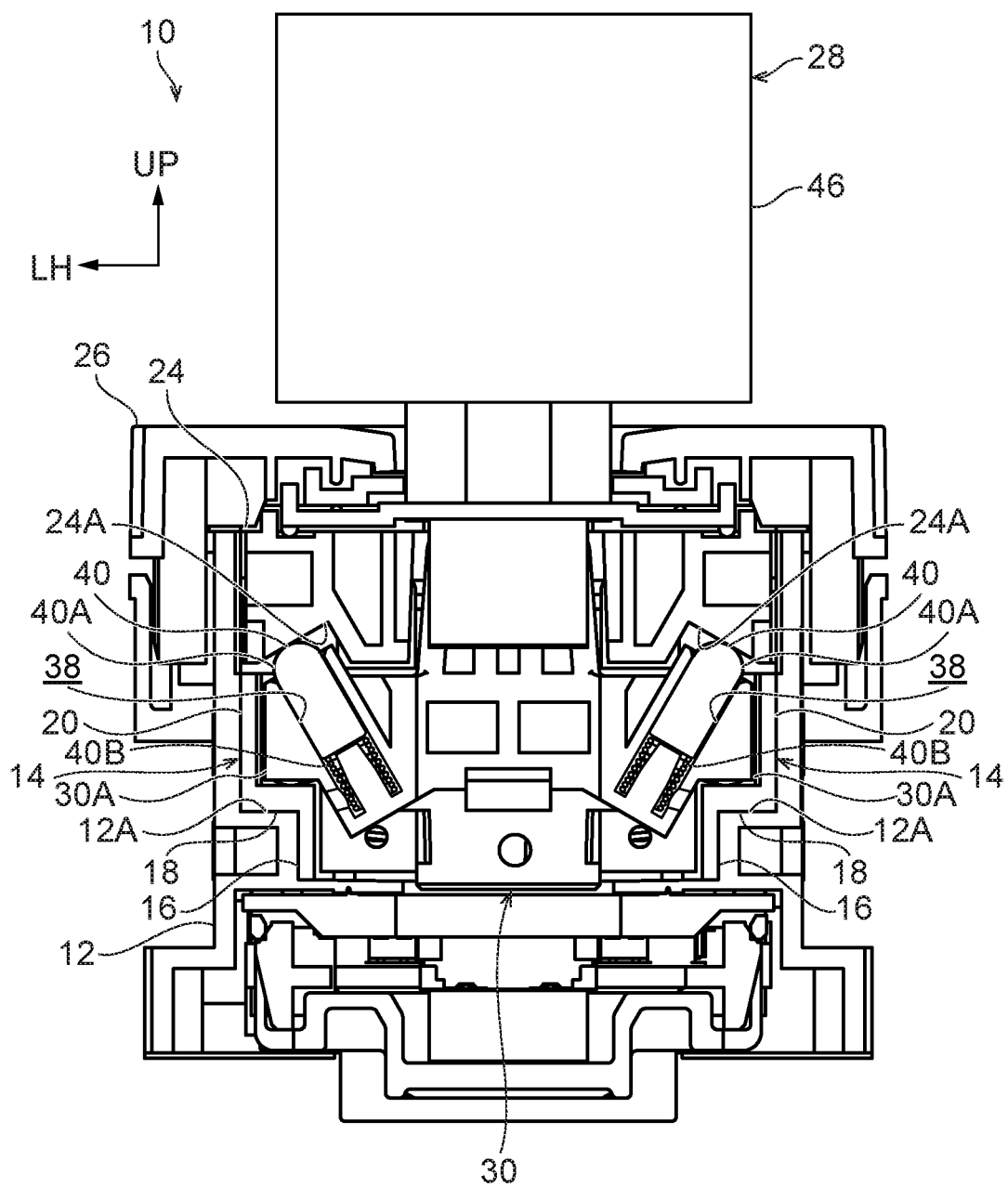
FIG. 4 is a cross-sectional view (taken across a line 4-4 in FIG. 1) looking from the rear side showing the shift device according to the exemplary embodiment of the present invention.

Circular cylinder shaped urging holes 38 (see FIG. 4) are formed in a front end portion and a rear end portion of the slides 30A. The urging holes 38 are disposed such that an axial direction thereof is perpendicular to the urging surfaces 24A of the holder 24, and are open towards directions that slope gradually upwards approaching outer sides in the left and right directions of the lever 28. Urging mechanisms 40 which serve as sliding motion urging mechanisms are provided in the urging holes 38. Substantially circular column shaped urging pins 40A that are made from a hard resin (for example, POM resin) and serve as urging portions are provided in the urging mechanisms 40. The urging pins 40A are fitted into the urging holes 38, and upper-side surfaces thereof protrude in a spherical shape. Urging springs 40B (i.e., compression coil springs) which serve as urging components extend between the urging pins 40A and bottom surfaces (i.e., lower-side surfaces) of the urging holes 38. As a result, upper-side surfaces of the urging pins 40A are made to abut against the urging surfaces 24A by urging force from the urging springs 40B, and the urging springs 40B urge the slides 30A in directions that slope downwards approaching the inner side in the left and right directions of the lever 28.

Circular cylinder shaped moderating holes 42 are formed in a central portion in the front-rear direction of the slides 30A. The moderating holes 42 are disposed such that an axial direction thereof is parallel with the up-down direction, and are open towards the upper side. Moderating mechanisms 44 which serve as shift urging mechanisms are provided in the moderating holes 42. Substantially circular column shaped moderating pins 44A that are made from a hard resin (for example, POM resin) and serve as moderating portions are provided in the moderating mechanisms 44. The moderating pins 44A are fitted into the moderating holes 42, and upper surfaces thereof protrude in a spherical shape. Moderating springs 44B (i.e., compression coil springs) which serve as moderating components extend between the moderating pins 44A and bottom surfaces (i.e., lower surfaces) of the moderating holes 42. As a result, upper surfaces of the moderating pins 44A are made to abut against central portions in the front-rear direction of the moderating surfaces 24B of the holder 24 by urging force from the moderating springs 44B, and the moderating springs 44B urge the slides 30A towards the lower side.

An intermediate portion in the up-down direction of the lever main body 30 is inserted between the pair of moderating surfaces 24B of the holder 24 so as to be able to slide in the front-rear direction, and is also inserted through an upper wall of the housing gate 26 of the housing 20 so as to be able to slide in the front-rear direction. An upper portion of the lever main body 30 extends beyond the upper side of the housing gate 26.

A substantially rectangular-parallelepiped shaped knob 46 which serves as an operating portion is fixed to the upper portion of the lever main body 30, so that the knob 46 is disposed inside the vehicle cabin. The knob 46 is able to be gripped by a vehicle occupant (particularly by the driver), and the lever 28 is moved slidingly in the front-rear direction as a result of the knob 46 being gripped by the vehicle occupant and operated in the front-rear direction. The lever 28 is placed in an 'N' position (neutral position) which serves as a shift position. The lever 28 may then be moved slidingly forwards from the 'N' position so as to be placed in an 'R' position (reverse position) which also serves as a shift position, and may also be moved slidingly backwards from the 'N' position so as to be placed in a 'D' position (drive position) which also serves as a shift position.

When the lever 28 is disposed in the 'R' position, as is described above, the restricting projections 36 on the front side of the lever main body 30 abut against the upper-side portions of the stoppers 22 on the front side of the soft materials 14, so that a sliding motion of the lever 28 towards the front side is restricted. When the lever 28 is disposed in the 'D' position, as is described above, the restricting projections 36 on the rear side of the lever main body 30 abut against the upper-side portions of the stoppers 22 on the rear side of the soft materials 14, so that a sliding motion of the lever 28 towards the rear side is restricted.

As is described above, in the moderating mechanisms 44, the upper surfaces of the moderating pins 44A are made to abut against central portions in the front-rear direction of the moderating surfaces 24B of the holder 24 by urging force from the moderating springs 44B, and the lever 28 is urged towards the 'N' position side by the moderating springs 44B, and is disposed in the 'N' position. When the lever 28 is operated from the 'N' position in the front-rear direction, the upper surfaces of the moderating pins 44A are moved in the front-rear direction from the central portion in the front-rear direction of the moderating surfaces 24B while resisting the urging force of the moderating springs 44B. If the operating force applied to the lever 28 is released when the lever 28 has been operated to a position other than the 'N' position, then the upper surfaces of the moderating pins 44A are moved towards the central portion side in the front-rear direction of the moderating surfaces 24B by the urging force from the moderating springs 44B, and the lever 28 is moved (i.e., restored) slidingly to the 'N' position.

A rectangular-parallelepiped shaped magnet 48 which serves as a detecting portion is fixed via insert-molding to a lower end portion of the lever main body 30. The magnet 48 is exposed on the lower side of the lever main body 30, and is moved slidingly in the front-rear direction integrally with the lever main body 30.

A substantially planar sensor substrate 50 (i.e., a circuit substrate) which serves as a detecting mechanism is fixed to a lower end portion of the base plate 12 interior. The sensor substrate 50 is disposed so as to extend perpendicularly to the up-down direction, and faces towards the magnet 48 in the lever main body 30 in the up-down direction. By detecting the magnetic field generated by the magnet 48, the sensor substrate 50 detects the position in the front-rear direction of the magnet 48. As a result, the position in the front-rear direction of the lever 28 is detected, and the shift position of the lever 28 is detected.

Next, actions of the present exemplary embodiment will be described.

In the shift device 10 having the above-described structure, the lower sliding projections 32 and the horizontal sliding projections 34 of the lever main body 30 of the lever 28 are moved slidingly in a front-rear direction relative to the lower sliding plates 18 and the horizontal sliding plates 20 respectively of the soft materials 14 within the base plate 12, so that the lever 28 is moved slidingly in the front-rear direction. Furthermore, when the lever 28 is being moved slidingly in the front-rear direction, the upper-side surface of the urging pins 40A in the lever 28 are moved slidingly in the front-rear direction relative to the urging surfaces 24A of the holder 24 by the urging force of the urging springs 40B, and the upper surfaces of the moderating pins 44A in the lever 28 are moved slidingly in the front-rear direction relative to the moderating surfaces 24B of the holder 24 by the urging force of the moderating springs 44B.

In addition, the restricting projections 36 of the lever main body 30 are abutted against the upper-side portions (i.e., the portions around the intermediate recessed portions 22B) of the stoppers 22 in the soft materials 14, so that a sliding motion of the lever 28 in the front-rear direction is restricted. Furthermore, as a result of the sensor substrate 50 detecting the position in the front-rear direction of the magnet 48 of the lever main body 30, the position of the lever 28 in the front-rear direction is detected, so that the shift position of the lever 28 is also detected.

Here, the lower sliding plates 18 and the horizontal sliding plates 20 of the soft materials 14 are formed from a softer material than the lower sliding projections 32 and the horizontal sliding projections 34 of the lever main body 30. Because of this, the slidability of the lower sliding projections 32 and the horizontal sliding projections 34 against the lower sliding plates 18 and the horizontal sliding plates 20 (for example, the abrasion resistance of the lower sliding projections 32 and the horizontal sliding projections 34) can be increased, so that the slidability of the lever main body 30 and the slidability of the lever 28 can both be improved.

Moreover, the stoppers 22 of the soft materials 14 are formed from a softer material than the restricting projections 36 of the lever main body 30. Because of this, when the restricting projections 36 are abutted against the upper-side portion of the stoppers 22 so that the sliding motion of the lever 28 is restricted, the sound generated by this restricting of the sliding motion of the lever 28 (i.e., the sound generated when the restricting projections 36 abut against the upper-side portion of the stoppers 22) can be reduced. Furthermore, the rigidity of the upper-side portion of the stoppers 22 is decreased by the outer recessed portions 22A and the intermediate recessed portions 22B. Because of this, the sound generated when the sliding motion of the lever 28 is restricted can be effectively reduced.

In addition, the lower sliding plates 18, the horizontal sliding plates 20, and the stoppers 22 are formed in the soft materials 14, and the lower sliding plates 18, the horizontal sliding plates 20, and the stoppers 22 are formed as a single integrated body. Because of this, the number of components can be reduced, and the structure of the shift device 10 can be simplified.

Furthermore, the soft materials 14 (i.e., the lower sliding plates 18, the horizontal sliding plates 20, and the stoppers 22) are integrally molded together with the base plate 12. Because of this, the number of steps required to assemble the shift device 10 can be reduced.

Moreover, the lower sliding projections 32 of the lever 28 abut against the lower sliding plates 18 of the lower soft materials 14, the upper-side surfaces of the urging pins 40A of the lever 28 are abutted against the urging surfaces 24A of the holder 24 by the urging force of the urging springs 40B, and the urging springs 40B urge the lever 28 towards the lower side (i.e., towards the lower sliding plate 18 side of the lower sliding projections 32). Because of this, when the lever 28 is being moved slidingly, a tilting motion of the lever 28 in the front-rear directions and left-right directions can be inhibited, and the slidability of the lever 28 can be improved.

Furthermore, the upper-side surfaces of the urging pins 40A of the lever 28 are abutted against the urging surfaces 24A of the holder 24 by the urging force of the urging springs 40B, and the urging springs 40B urge the lever 28 towards the inner side in the left-right direction of the lever 28 (i.e., towards the sliding width direction side). Because of this, when the lever 28 is being slidingly moved, any play in the lever 28 in the left-right direction can be inhibited, and the slidability of the lever 28 can be improved more effectively.

Moreover, the upper surfaces of the moderating pins 44A of the lever 28 are abutted against the moderating surfaces 24B of the holder 24 by the urging force of the moderating springs 44B, and the moderating springs 44B urge the lever 28 towards the lower side (i.e., towards the lower sliding plate 18 side of the lower sliding projections 32). Because of this, when the lever 28 is being slidingly moved, a tilting motion of the lever 28 in the front-rear directions and left-right directions can be effectively inhibited, and the slidability of the lever 28 can be improved more effectively.

Furthermore, when the shift device 10 is being assembled, the urging springs 40B and the urging pins 40A are inserted into the urging holes 38 in the lever 28 from the upper side thereof, and the moderating springs 44B and the moderating pins 44A are inserted into the moderating holes 42 in the lever 28 from the upper side thereof. Because of this, the urging springs 40B, the urging pins 40A, the moderating springs 44B, and the moderating pins 44A can all be assembled in the lever 28 from the same side (i.e., from the upper side), and it is possible to inhibit the urging springs 40B, the urging pins 40A, the moderating springs 44B, so that the moderating pins 44A from falling out from the lever 28, and the ease of assembling the shift device 10 can be improved.

Moreover, the horizontal sliding projections 34 and the lower sliding projections 32 in the lower portion of the lever 28 are supported so as to be able to slide respectively against the horizontal sliding plates 20 and the lower sliding plates 18 of the soft materials 14, and the magnet 48 is also provided in the lower portion of the lever 28. Because of this, the accuracy of the slide position of the magnet 48 resulting from the sliding motion of the lever 28 can be increased, so that the accuracy when the shift position of the lever 28 is detected by the sensor substrate 50 can also be increased.

Furthermore, as is described above, the urging springs 40B and the moderating springs 44B urge the lever 28 towards the lower side (i.e., towards the lower sliding plate 18 side of the lower sliding projections 32), and the magnet 48 is urged towards the sensor substrate 50 side. Because of this, the accuracy of the slide position of the magnet 48 relative to the sensor substrate 50 resulting from the sliding motion of the lever 28 can be increased, so that the accuracy when the shift position of the lever 28 is detected by the sensor substrate 50 can also be increased.

Note that in the present exemplary embodiment, the soft materials 14 are molded integrally with the base plate 12 via insert molding. However, it is also possible for the soft materials 14 to be formed separately from the base plate 12, and then attached to the base plate 12.

Moreover, in the present exemplary embodiment, the urging surfaces 24A are provided on the base plate 12 side, and the urging springs 40B and urging pins 40A are provided on the lever 28 side. However, it is also possible for the urging springs 40B and urging pins 40A to be provided on the base plate 12 side, and for the urging surfaces 24A to be provided on the lever 28 side.

Furthermore, in the present exemplary embodiment, the moderating surfaces 24B are provided on the base plate 12 side, and the moderating springs 44B and moderating pins 44A are provided on the lever 28 side. However, it is also possible for the moderating springs 44B and moderating pins 44A to be provided on the base plate 12 side, and for the moderating surfaces 24B to be provided on the lever 28 side.

Furthermore, in the present exemplary embodiment, the lever 28 is able to slide in a single direction (i.e., in the front-rear direction). However, it is also possible for the lever 28 to be able to slide in a plurality of mutually intersecting directions (for example, in the front-rear directions and left-right directions).

Moreover, in the present exemplary embodiment, the shift device 10 is a floor-mounted shift device that is installed on the floor portion of a vehicle cabin. However, the shift device 10 may instead be installed in a console, instrument panel, or steering column of a vehicle cabin.

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A shift device comprising:
    a shift body that is provided with a sliding portion and a restricted portion, and that, as a result of the shift body, the sliding portion, and the restricted portion being moved slidingly along a length direction, causes a shift position to be altered;
    a slid-against portion that is formed from a softer material than the sliding portion so as to be more deformable than the sliding portion, and along which the sliding portion is moved slidingly as a result of the shift body being moved slidingly;
    a restricting portion that is formed from a softer material than the restricted portion so as to be more deformable than the restricted portion, that is provided integrally with the slid-against portion, and that restricts a sliding motion of the restricted portion so that a sliding motion of the shift body is restricted, and
    a supporting body that supports the shift body, and with which the slid-against portion and the restricting portion are integrally molded,
    wherein at least one reduced-rigidity portion provided at the restricting portion is a stop abutment including a recessed portion, and
    wherein a dimension of the recessed portion in a restricting width direction of the restricting portion is less than a dimension of the restricted portion in the restricting width direction of the restricting portion so that the restricted portion abuts against a face of the restricting portion in which the recessed portion is opened so that the sliding motion of the restricted portion is restricted.

2. The shift device according to claim 1, further comprising a sliding motion urging mechanism that urges the shift body towards a slid-against portion side.

3. The shift device according to claim 2, wherein the sliding motion urging mechanism urges the shift body towards a sliding width direction side of the shift body.

4. The shift device according to claim 3, wherein the sliding motion urging mechanism urges the shift body towards an inner side in a sliding width direction of the shift body.

5. The shift device according to claim 1, wherein a detecting portion is provided at a slid-against portion side of the shift body, and, as a result of a slide position thereof being detected, the shift position of the shift body is detected.

6. The shift device according to claim 1, wherein the sliding portion comprises a first sliding portion that protrudes in a sliding width direction of the shift body, and a second sliding portion that protrudes in a sliding vertical direction of the shift body.

7. A shift device comprising:
    a shift body that is provided with a sliding portion and a restricted portion, and that, as a result of the shift body, the sliding portion, and the restricted portion being moved slidingly, causes a shift position to be altered;
    a slid-against portion that is formed from a softer material than the sliding portion so as to be more deformable than the sliding portion, and along which the sliding portion is moved slidingly as a result of the shift body being moved slidingly; and
    a restricting portion that is formed from a softer material than the restricted portion so as to be more deformable than the restricted portion, that is provided integrally with the slid-against portion, and that restricts a sliding motion of the restricted portion so that a sliding motion of the shift body is restricted, and further comprising a urging mechanism that urges the shift body in two directions towards a slid-against portion side wherein the sliding motion urging mechanism urges the shift body towards a first slide-against portion which is disposed in a sliding width direction of the shift body and towards a second slide-against portion which is disposed in a sliding vertical direction of the shift body.

8. A shift device comprising:
- a shift body that is provided with a sliding portion and a restricted portion, and that, as a result of the shift body, the sliding portion, and the restricted portion being moved slidingly along a length direction, causes a shift position to be altered;
- a slid-against portion that is formed from a softer material than the sliding portion so as to be more deformable than the sliding portion, and along which the sliding portion is moved slidingly as a result of the shift body being moved slidingly;
- a restricting portion that is formed from a softer material than the restricted portion so as to be more deformable than the restricted portion, that is provided integrally with the slid-against portion, and that restricts a sliding motion of the restricted portion so that a sliding motion of the shift body is restricted, and
- a sliding motion urging mechanism that urges the shift body towards a slid-against portion side, wherein at least one reduced-rigidity portion provided at the restricting portion is a stop abutment including a recessed portion, and wherein a dimension of the recessed portion in a restricting width direction of the restricting portion is less than a dimension of the restricted portion in the restricting width direction of the restricting portion so that the restricted portion abuts against a face of the restricting portion in which the recessed portion is opened so that the sliding motion of the restricted portion is restricted, and wherein the sliding motion urging mechanism urges the shift body towards a sliding width direction side of the shift body.

9. The shift device according to claim 8, wherein the sliding motion urging mechanism urges the shift body towards an inner side in a sliding width direction of the shift body.

\* \* \* \* \*